United States Patent [19]
Peter

[11] Patent Number: 5,882,112
[45] Date of Patent: Mar. 16, 1999

[54] ELASTOMER MIXING UNIT

[75] Inventor: Julius Peter, Vienna, Austria

[73] Assignee: Continental AG, Hanover, Germany; part interest

[21] Appl. No.: 900,102

[22] Filed: Jul. 25, 1997

[30] Foreign Application Priority Data

Jul. 25, 1996 [DE] Germany ............... 196 030 021.5

[51] Int. Cl.[6] ............................................. B29B 7/86
[52] U.S. Cl. ........................ 366/75; 366/97; 366/139
[58] Field of Search ............................ 366/97, 98, 99, 366/100, 139, 75, 69, 83–86; 425/207

[56] References Cited

U.S. PATENT DOCUMENTS 2,340,022  1/1944  Shellenberger ..................... 366/97
5,476,319  12/1995  Blach ................................. 366/139
5,716,130  2/1998  Wood ................................. 366/99

Primary Examiner—Tony G. Soohoo
Attorney, Agent, or Firm—Robert W. Becker & Associates

[57] ABSTRACT

A mixing unit for mixing rubber has a mixing chamber and at least one rotor positioned therein. A drive, for driving the at least one rotor, is positioned exterior to the mixing chamber. The at least one rotor has a shaft penetrating outwardly from the mixing chamber and connected to the drive. An inlet opening is positioned at the top side of the mixing chamber. A first closure closes the inlet opening. An outlet opening is positioned at the bottom of the mixing chamber and can be closed by a second closure. At least one first connector is provided for affecting pressure in the mixing chamber. An air-tight enclosure for the shaft penetrating from the mixing chamber is provided. The enclosure has at least one second connector for affecting pressure in the enclosure.

9 Claims, 1 Drawing Sheet

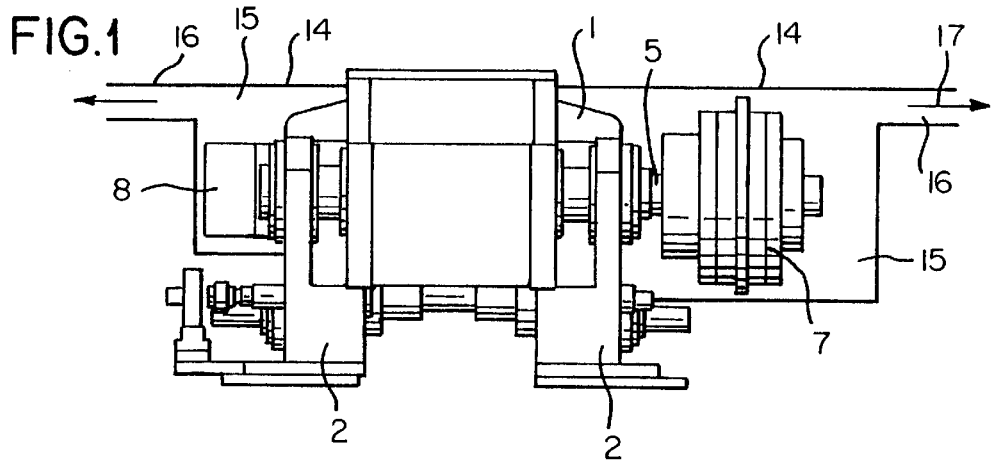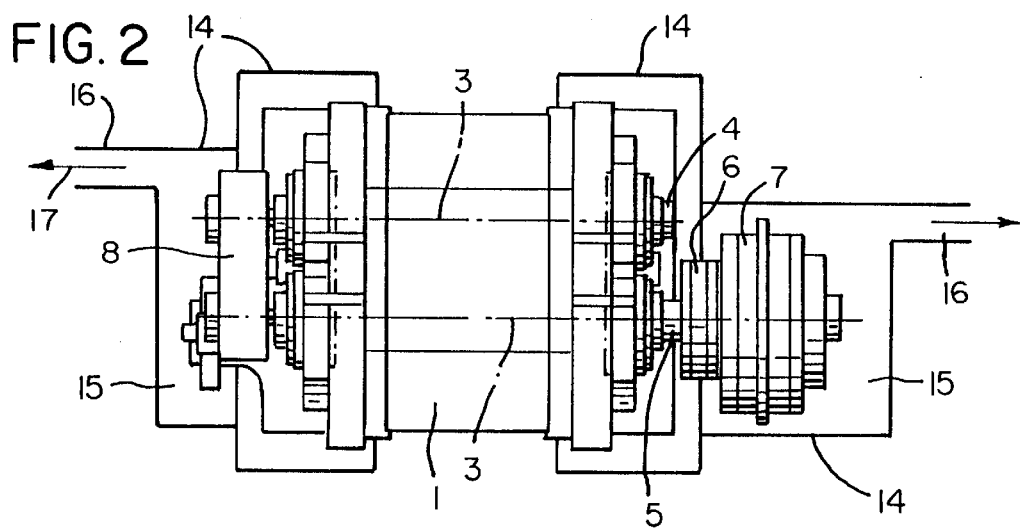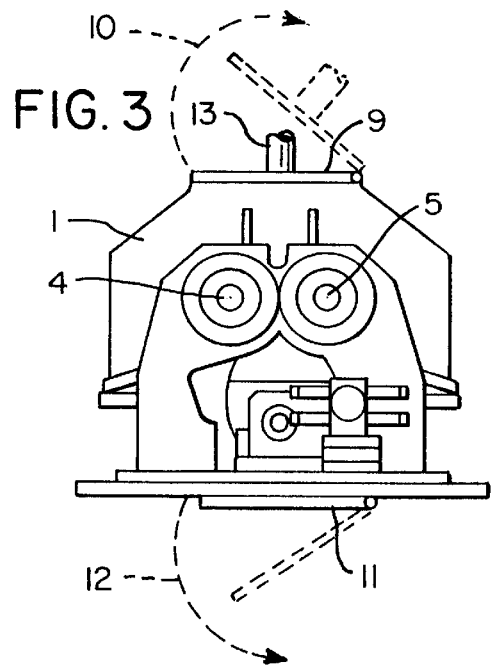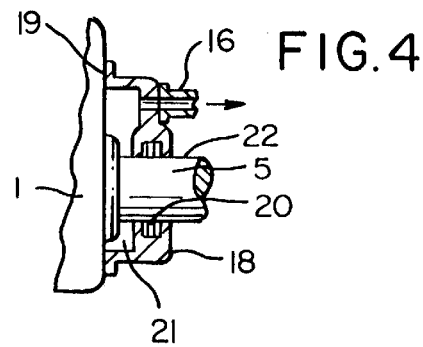

ELASTOMER MIXING UNIT

BACKGROUND OF THE INVENTION

The present invention relates to an elastomer mixing unit, especially a mixing unit for rubber and rubber mixtures, with a mixing chamber, one or two rotors arranged in the mixing chamber and having shafts that penetrate the sidewalls of the mixing chamber, respectively, its housing. An inlet opening that is closed off is provided at the top. An outlet opening that can be closed off by a flap is provided for removing the mixed material. The mixing unit has one or more connectors for a suction line or a compressed air line for affecting the pressure within the mixing chamber.

In certain situations it is expedient to produce rubber mixtures in a vacuum or to perform mastication of natural rubber at increased air pressure. It is known to evacuate the mixing chamber with a suction line by providing suction within the area of the closeable inlet opening of the mixing unit. This type of mixing is, however, unsatisfactory because the rotor shafts must be positioned exterior to the mixing chamber and must be driven exterior to the mixing chamber. The required penetration of the sidewalls of the mixing chamber, respectively, of the mixing chamber housing and the thus resulting leaks prevent a sufficiently great pressure difference relative to the atmosphere.

It is therefore an object of the present invention to provide a mixing unit of the aforementioned kind with which in the mixing chamber a sufficiently high pressure or vacuum can be produced with simple technical means.

SUMMARY OF THE INVENTION

A mixing unit for mixing rubber according to the present invention is primarily characterized by:

a mixing chamber;

at least one rotor positioned in the mixing chamber;

a drive, for driving the at least one rotor, positioned exterior to the mixing chamber;

the at least one rotor having a shaft penetrating outwardly from the mixing chamber and connected to the drive;

an inlet opening positioned at a top side of the mixing chamber;

a first closure for closing the inlet opening;

an outlet opening positioned at the bottom of the mixing chamber;

a second closure for closing the outlet opening;

at least one first connector for affecting the pressure in the mixing chamber;

an air-tight enclosure for the shaft penetrating from the mixing chamber;

the enclosure having at least one second connector for affecting the pressure in the enclosure.

Advantageously, the enclosure is a chamber.

The drive is preferably enclosed in the enclosure.

The enclosure includes a wall having a shaft seal, and the shaft or shafts extend through the shaft seal(s).

The drive is a hydraulic drive.

The enclosure is comprised of a first and a second chamber positioned on opposed sides of the mixing chamber for enclosing opposed ends of the shaft or shafts. The at least one first connector for affecting pressure in the mixing chamber is located at the first enclosure.

The mixing unit preferably further comprises an air-tight cover member for the first enclosure and/or for the second enclosure.

According to the present invention, the penetration locations of the shaft ends of the rotor or rotors from the mixing chamber, respectively, mixing chamber housing are enclosed by a practically air-tight enclosure with enclosure walls which have one or more connectors to the device that supplies pressure or vacuum.

The walls can form a chamber enclosing the lateral area of the mixing unit, i.e., the side of the mixing unit where the end of the rotor shaft is positioned. The opposed side of the mixing chamber can also be provided with an enclosure in the form of a chamber. However, the opposite sides can also be provided with special shaft seals in order to ensure a practically air-tight penetration of the rotor shafts through the mixing chamber walls (housing walls).

It is possible, in general, to ensure, exclusively by providing the connectors at the enclosure, the desired pressure conditions within the mixing chamber. However, they are preferably used in connection with devices, respectively, sockets in the area of the inlet opening of the mixing unit because in this case especially good pressure conditions can be provided. In the case of employing both measures, it is especially advantageous when the inventive lateral chambers are provided with a pressure that can be generated with the devices that are connected in the area of the inlet opening of the mixing chamber.

If it is required to enclose also the drives for the rotors, it is expedient according to the present invention to employ hydraulic drives. These drives are especially compact and are thus especially suitable for enclosure in a chamber.

Furthermore, it is expedient to employ the invention with such mixing units that operate without a ram because it is thus possible to install in a simple manner in the area of the inlet opening a lid-like cover member with suction or pressure connector.

BRIEF DESCRIPTION OF THE DRAWINGS

The object and advantages of the present invention will appear more clearly from the following specification in conjunction with accompanying drawings, in which:

FIG. 1 is a schematically represented ramless mixing unit for rubber and rubber mixtures in a front view;

FIG. 2 shows the mixer according to FIG. 1 in a top view;

FIG. 3 shows the mixer according to FIG. 1 in a side view;

FIG. 4 is a detail of another embodiment of the mixing unit showing the drive side of the rubber mixing unit in a vertical, part-sectional view.

DESCRIPTION OF PREFERRED EMBODIMENTS

The present invention will now be described in detail with the aid of several specific embodiments utilizing FIGS. 1–4.

The housing 1 of the mixing unit is supported by supports 2 and encloses the mixing chamber in which two rotors are positioned that operate in opposite directions. Their axes 3 extend parallel to one another. The corresponding shafts 4, 5 extend outwardly from the housing 1 at opposed sides of the mixing unit. A hydraulic drive 7 is provided at the shaft 4 and engages the shaft 4 via clutch 6. At the opposite side of the mixing unit the respective shaft ends are connected by a gear box 8.

The inlet opening of the mixing unit at the top of the mixing chamber is closeable by a flap shaped closure 9. It can be opened in the direction of arrow 10 for loading the ramless kneader, but can also enclose in an air-tight manner an already present closure of the inlet opening. In the closed state, the inlet opening, respectively, the closure positioned thereat can be hermetically sealed. The mixed material leaves the mixing unit via a pivotable saddle closure 11. The opening movement is indicated by arrow 12. When the saddle closure is not air-tight, an additional pivotable cover member may be provided that makes it possible to apply vacuum to the mixing chamber.

The closure 9 includes a tubular connector 13 to which can be connected a vacuum source in order to perform the mixing process under vacuum.

The important feature of the invention is that at opposed sides of the mixing unit enclosure walls 14 are connected to the housing 1 in an air-tight manner so as to form closed chambers or cells 15 which are provided with a vacuum connector 16. The air is thus removed in the direction of arrow 17. The vacuum is adjusted such that between the mixing chamber, on the one hand, and the cells or chambers 15, on the other hand, no pressure difference results. Pressure losses can not occur via the gaps or slots that result at the locations at which the shafts 4, 5 penetrate the housing 1, respectively, the walls of the mixing chamber. At the drive side the chambers or cells 15 are sized such that they enclose hermetically the clutch 6 and the hydraulic drive 7.

In the case that the drive is too large, it is also possible to use a chamber 21 according to FIG. 4. The shaft 5 penetrates a bore 22 in the wall 18 which is connected in an air-tight manner at location 19 to the housing 1. In order to provide a sufficient sealing action, a labyrinth seal 20 is provided which can optionally be replaced by a similarly acting shaft seal.

The present invention is, of course, in no way restricted to the specific disclosure of the specification and drawings, but also encompasses any modifications within the scope of the appended claims.

What I claim is:

1. A mixing unit for mixing rubber, said mixing unit comprising:

a mixing chamber;

at least one rotor positioned in said mixing chamber;

a drive, for driving said at least one rotor, positioned exterior to said mixing chamber;

said at least one rotor having a shaft penetrating outwardly from said mixing chamber and connected to said drive;

an inlet opening positioned at a top side of said mixing chamber;

a first closure for closing said inlet opening;

an outlet opening positioned at a bottom of said mixing chamber;

a second closure for closing said outlet opening;

at least one first connector for supplying pressure to said mixing chamber;

an air-tight enclosure for said shaft penetrating from said mixing chamber;

said enclosure having a least one second connector for supplying pressure to said enclosure.

2. A mixing unit according to claim 1, wherein said enclosure is a chamber.

3. A mixing unit according to claim 1, wherein said drive is enclosed in said enclosure.

4. A mixing unit according to claim 1, wherein said enclosure includes a wall having a shaft seal and wherein said shaft extends through said shaft seal.

5. A mixing unit according to claim 1, wherein said drive is a hydraulic drive.

6. A mixing unit according to claim 1, wherein said enclosure is comprised of a first and a second chamber positioned on opposed sides of said mixing chamber for enclosing opposed ends of said shaft.

7. A mixing unit according to claim 1, wherein said at least one first connector for supplying pressure to said mixing chamber is located at said first enclosure.

8. A mixing unit according to claim 1, further comprising an air-tight cover member for said first closure.

9. A mixing unit according to claim 1, further comprising an air-tight cover member for said second closure.

* * * * *